C. L. & H. C. BECKHAM.
CUSHION TIRE.
APPLICATION FILED JUNE 25, 1915.
1,166,314. Patented Dec. 28, 1915.
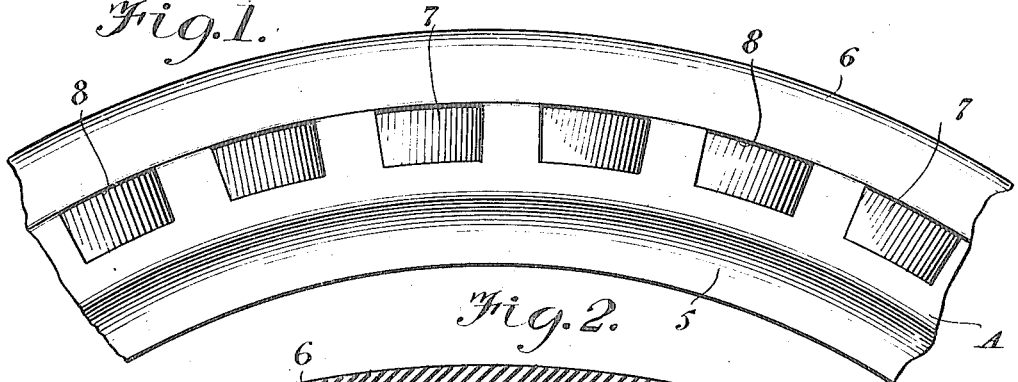
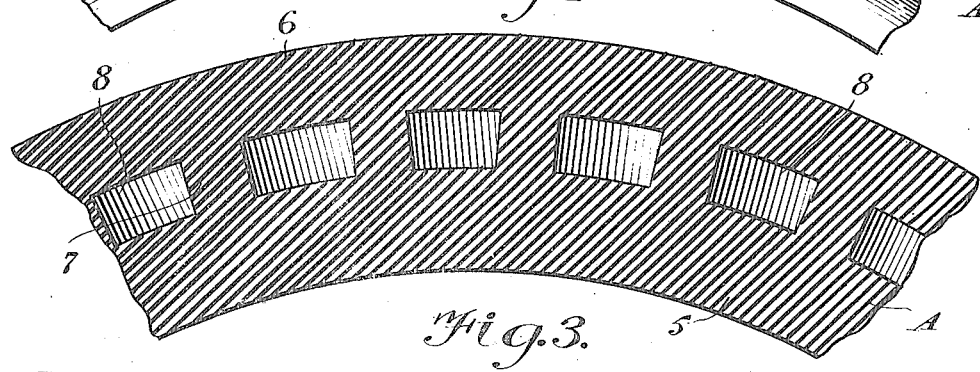
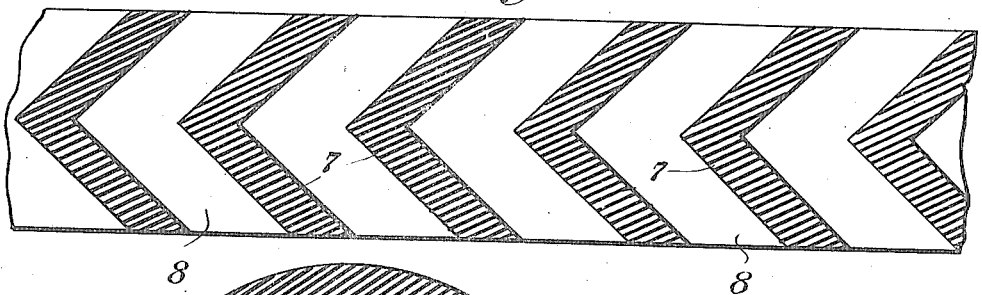
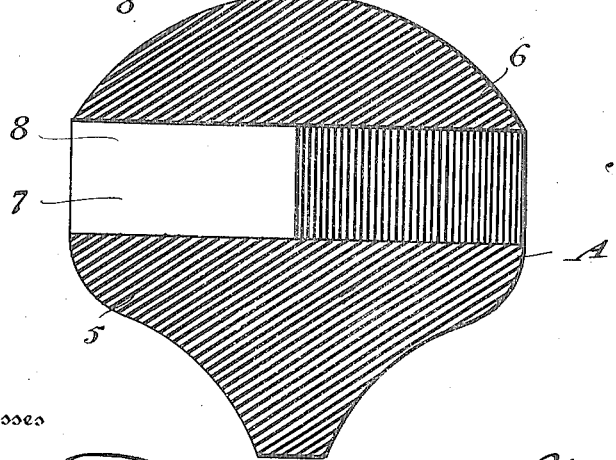
Witnesses
Inventors
C. L. Beckham,
H. C. Beckham.
By Victor J. Evans
Attorney

UNITED STATES PATENT OFFICE.

CHARLES L. BECKHAM AND HARRY C. BECKHAM, OF TOLEDO, OHIO.

CUSHION-TIRE.

1,166,314.  Specification of Letters Patent.  Patented Dec. 28, 1915.

Application filed June 25, 1915. Serial No. 36,344.

*To all whom it may concern:*

Be it known that we, CHARLES L. BECKHAM and HARRY C. BECKHAM, citizens of the United States, residing at Toledo, in the county of Lucas and State of Ohio, have invented new and useful Improvements in Cushion-Tires, of which the following is a specification.

The invention relates to tires, and more particularly to the class of cushion tires for vehicle wheels.

The primary object of the invention is the provision of a tire of this character wherein the required resiliency is had for absorbing shocks and jars incident to the travel of the wheel without the use of air or an inflated body, thereby avoiding punctures, blowouts, and the like, and assuring lightness and greater durability.

Another object of the invention is the provision of a tire wherein the construction thereof is novel in form, and will withstand heavy loads, and also eliminate the collapsing of the said tire.

A further object of the invention is the provision of a tire of this character which is simple in construction, reliable and efficient in its purpose, strong, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary side elevation of a tire constructed in accordance with the invention. Fig. 2 is a vertical longitudinal sectional view. Fig. 3 is a transverse sectional plan view. Fig. 4 is a vertical transverse sectional view.

Similar reference characters indicate corresponding parts throughout the several views in the drawing.

Referring to the drawing in detail, the tire comprises a body A, preferably made from rubber having the required resiliency, and is of the ordinary well-known shape. This body includes a base section 5, an outer tread section 6, and a plurality of spaced intermediate webs 7 forming spaces 8 therebetween throughout the circumference of the body A. The webs 7 are integrally formed with the base and tread sections 5 and 6, respectively, and are preferably of V-shape with their branches diverging laterally, while the medial portions are located centrally of the body A of the tire. The webs 7 are made from the same material as the base and tread sections, and by reason of the particular construction the required elasticity is had, and also lightness in the weight of the tire. The webs 7 serve as cushions between the outer solid tread 6 and the solid bed 5 of the body of the tire, so that all shocks and jars are absorbed incident to the travel of the wheel on which the tire is mounted.

From the foregoing description, taken in connection with the accompanying drawing, the construction of the device will be clearly understood, and therefore a more extended explanation has been omitted.

What is claimed is:—

A tire comprising a resilient body having transversely disposed spaced substantially V-shaped passages arranged circumferentially of the body medially thereof and opening through opposite sides thereof, the bights in the said passages being disposed centrally of the body, the said passages being spaced equal distances apart to form alternate correspondingly shaped webs.

In testimony whereof we affix our signatures in presence of two witnesses.

CHARLES L. BECKHAM.
HARRY C. BECKHAM.

Witnesses:
J. F. STEPP,
NANNIE WILLIAMS.